May 8, 1923.

C. W. MacMILLAN 1,454,480

FILM SPOOL

Filed April 2, 1921

Charles Wright MacMillan
INVENTOR

BY Victor J. Evans
ATTORNEY

P. G. Thomas

WITNESSES

Patented May 8, 1923.

1,454,480

UNITED STATES PATENT OFFICE.

CHARLES WRIGHT MacMILLAN, OF PASSAIC, NEW JERSEY.

FILM SPOOL.

Application filed April 2, 1921. Serial No. 458,033.

*To all whom it may concern:*

Be it known that I, CHARLES WRIGHT MACMILLAN, a citizen of the United States, residing at Passaic, in the county of Passaic and State of New Jersey, have invented new and useful Improvements in Film Spools, of which the following is a specification.

As is well known by amateur photographers, the removal of the spool on which the film has been wound, is a matter of great difficulty. These spools have their ends flanged and are centrally provided with depressions to receive the lugs on the opposite sides of the camera.

It is the object of the present invention to form the edges of the flanges of a film spool in such a manner that the same may be effectively gripped by the fingers of a person desiring to remove the spool or by a headed element, whereby the removal of such spools will be greatly facilitated.

The foregoing object may be accomplished by a construction such as is disclosed by the drawings which accompany and which form part of this application.

In the drawings:—

Figure 1:
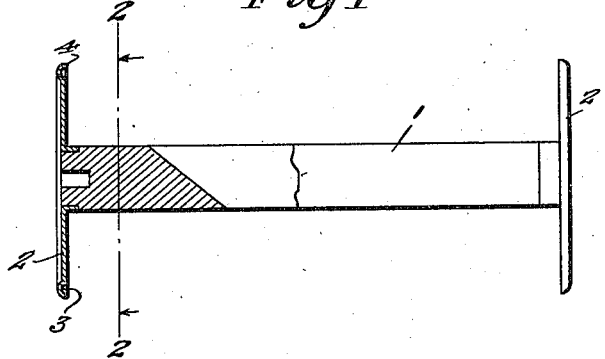
Figure 1 is an elevation of a spool having its flanges in section, and the said flanges being constructed in accordance with this invention.
Figure 2:
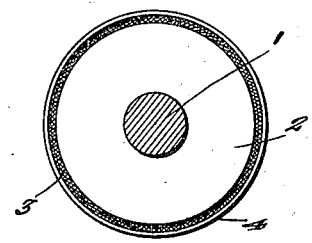
Figure 2 is a sectional view approximately on the line 2—2 of Figure 1.

A film spool hub, of the ordinary construction is indicated, in the figures of the drawing, by the numeral 1. The spool has its ends provided with flat annular flanges 2—2, of the usual construction, and the said ends of the spool are also centrally provided with the usual notches to receive the sustaining lugs or pins in the camera.

The flanges 2, at the inner edges thereof are formed with annular depressions 3, and the walls provided with the said depressions are serrated or roughened, as at 4. By this arrangement, it will be seen that the finger nail of the operator may be inserted in the groove or depression 3, and contacting with the roughened wall 4 thereof permit of the ready removal of the spool, when the movable lug or pin has been brought out of one of the notches in the end of the spool.

Figure 3:
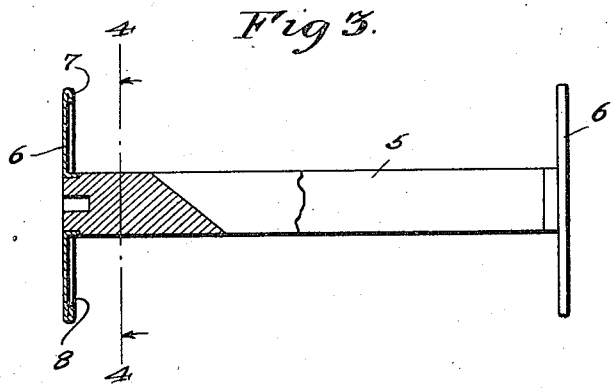
Figure 3 is a sectional view through the flanged end of a film spool illustrating a modification.
Figure 4:
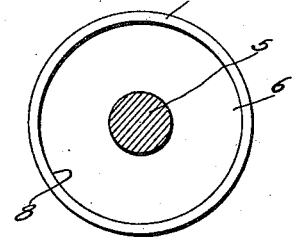
Figure 4 is a sectional view approximately on the line 4—4 of Figure 2.

In Figures 3 and 4, the spool 5 has its flanged end 6, which is constructed of metal, celluloid, or the like, bent inwardly, as at 7, and arranged flat against the inner face of the spool. The inner wall 8 of the inbent portion 7 provides a means whereby the same may be engaged by the finger of the operator, or by a suitable headed instrument if desired, to facilitate the removal of the spool from the camera.

Figure 5:
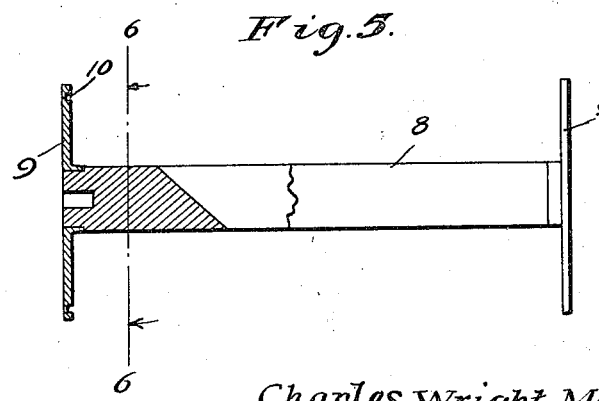
Figure 5 is a sectional view through the flanged end of a film spool illustrating a further modification.
Figure 6:
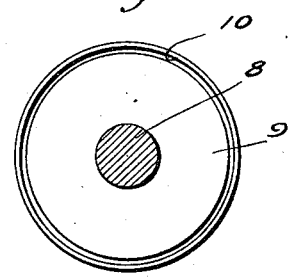
Figure 6 is a sectional view on the line 6—6 of Figure 5.

In Figures 5 and 6, the spool 8 has its flanged end 9 provided on its inner face, and adjacent its edge with a continuous depression 10, the wall of which being smooth and rectangular in cross section.

It is thought that the foregoing description, when taken in connection with the drawings will fully set forth the simplicity and advantages of the improvement.

Having described my invention, I claim:—

A film spool for cameras having flanged ends substantially constructed disc shape, the inner face of said discs being provided with a continuous depression arranged adjacent the outer edge thereof and the walls of said depressions being smooth and rectangular in cross section as and for the purpose specified.

In testimony whereof I affix my signature.

CHARLES WRIGHT MacMILLAN.